United States Patent [19]
Wagner et al.

[11] 4,378,294
[45] Mar. 29, 1983

[54] FILAMENT WOUND WELL SCREEN AND METHOD AND APPARATUS FOR MAKING SAME

[75] Inventors: Walter R. Wagner, Minneapolis; Henry E. Benson, Long Lake, both of Minn.

[73] Assignee: UOP Inc., Des Plaines, Ill.

[21] Appl. No.: 244,382

[22] Filed: Mar. 16, 1981

[51] Int. Cl.³ .................... B31C 13/00; E21B 43/08
[52] U.S. Cl. ................................. 210/460; 156/175; 166/231; 210/497.1
[58] Field of Search .............. 166/228, 229, 331, 231; 156/171, 173, 175, 180, 189, 192, 193, 195; 210/497.1, 460

[56] References Cited

U.S. PATENT DOCUMENTS

| | | | |
|---|---|---|---|
| 2,341,783 | 2/1944 | Jens | 166/5 |
| 2,487,769 | 11/1949 | Ebert et al. | 210/497.1 X |
| 2,658,128 | 4/1972 | Shobert | 166/231 |
| 2,682,309 | 6/1954 | Banchback | 210/497.1 X |
| 3,385,373 | 5/1968 | Brown | 166/232 |
| 3,398,837 | 8/1968 | Adams | 210/496 |
| 3,864,182 | 2/1975 | Shobert et al. | 166/231 X |

Primary Examiner—Frank A. Spear, Jr.
Attorney, Agent, or Firm—James R. Hoatson, Jr.; Barry L. Clark; Williaam H. Page, II

[57] ABSTRACT

A fiber reinforced plastic well screen including a slotted central section and unslotted end fitting portions is formed by manipulating a single bundle of resin-coated filaments longitudinally and circumferentially relative to a mandrel. The mandrel has a series of helically grooved segments which cooperate with each other to cause the filament bundle to form the slotted central section. Longitudinal wraps, which are looped under tension from one end of the mandrel to the other in the region between each adjacent pair of segments, are intimately bonded to all of the helical circumferential wraps which form the central section as well as those that form the end fitting portions. One removable end cap portion of the mandrel is preferably externally threaded to produce an integral internal thread in the formed well screen. A tubular internal sleeve portion of the mandrel is removable to permit the helically grooved segments to be collapsed inwardly after the well screen is cured.

13 Claims, 8 Drawing Figures

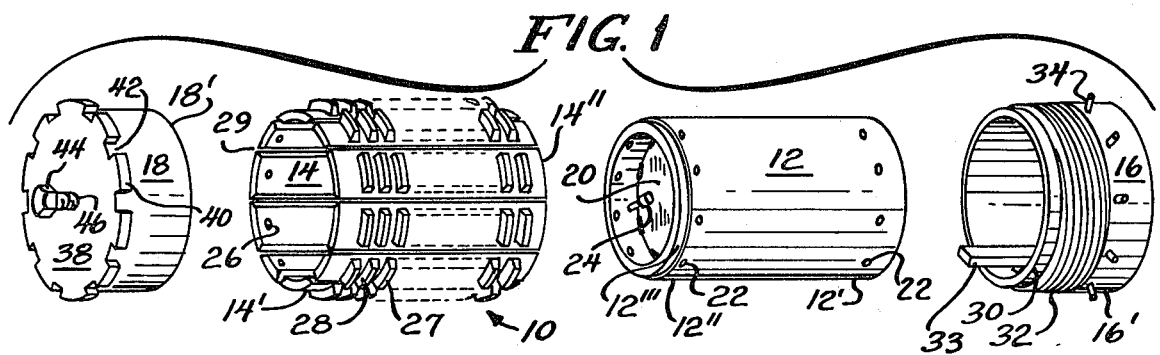
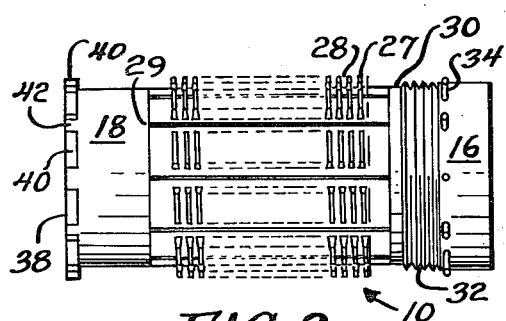
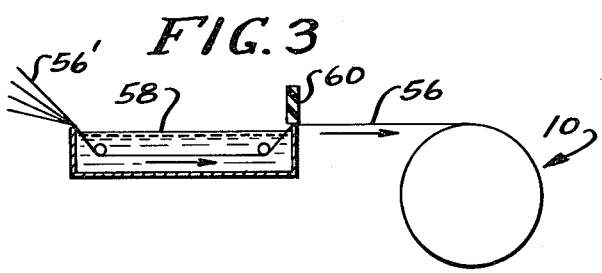
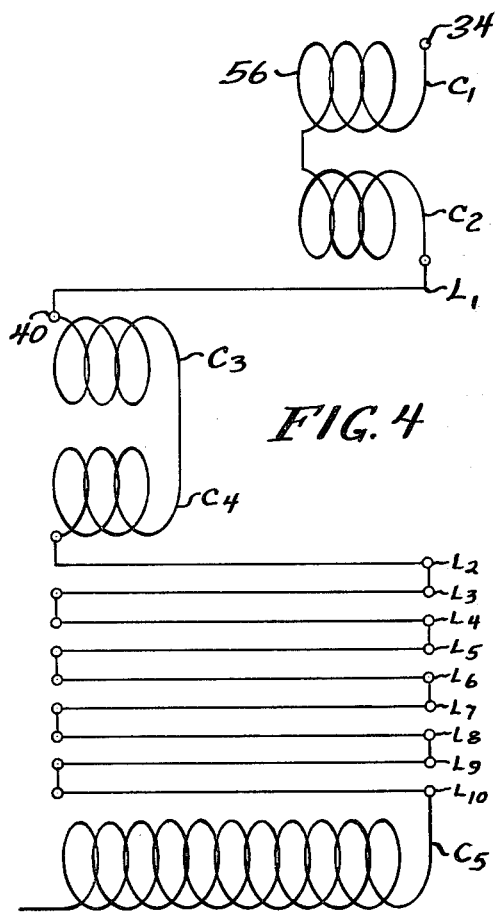
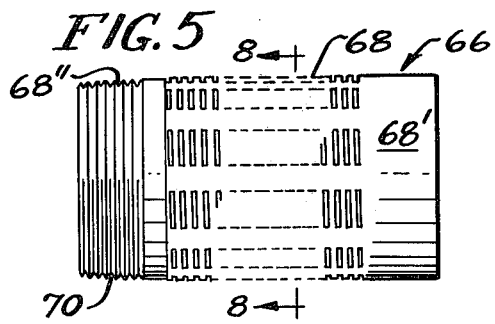
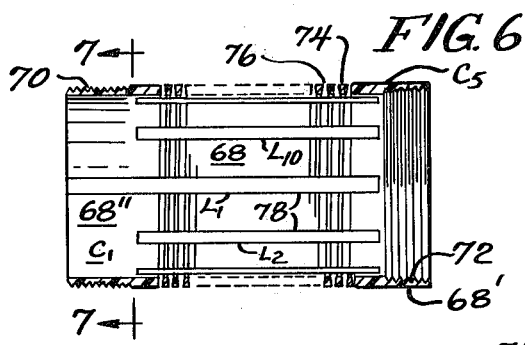
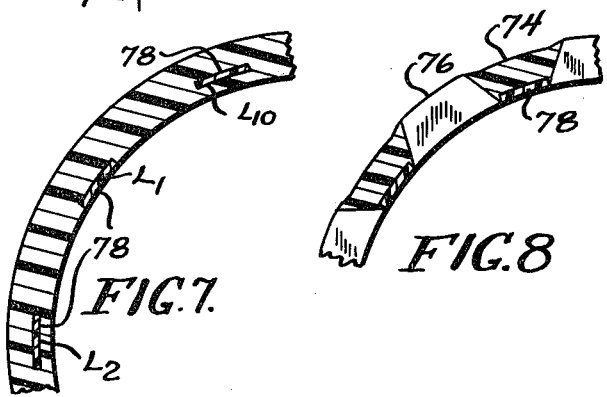

FILAMENT WOUND WELL SCREEN AND METHOD AND APPARATUS FOR MAKING SAME

BACKGROUND OF THE INVENTION

The invention relates to fiber reinforced plastic well screens and more particularly to well screens which incorporate resin-coated glass filaments. U.S. Pat. No. 3,658,128, issued to Samuel M. Shobert discloses such a screen wherein a bundle of resin-coated glass filaments is formed into a series of separate longitudinal bars, which may or may not be precured, and which are laid in longitudinal grooves in a mandrel, either under a series of wound circumferential wraps or between layers of circumferential wraps. The slots go to the end of the screen. A somewhat similar screen incorporating male and female end fittings is manufactured by Burgess Well Company, Inc. of Minden, Nebraska, but the longitudinal members are pultrusions which do not extend into the region of the female fitting. J. D. Brown U.S. Pat. No. 3,385,373 wraps plastic wires which have metal cores around a tubular inner sleeve. E. R. Adams U.S. Pat. No. 3,398,837 discloses a wound fiber filter which has its strands impregnated with resin after winding. A. A. Jens U.S. Pat. No. 2,341,783 discloses a metal screen assembled to end fittings.

Although the aforementioned reinforced plastic screens do offer the advantage of protection against corrosion, they would require a substantial amount of time to construct. Also, in the case of the Shobert screen, there do not appear to be any unslotted fitting areas on the ends although the circumferential wrap provides an internal thread which extends the entire length of the screen when the longitudinal bars are recessed. The Burgess screen has no longitudinal bars in its female end fitting portion, and thus cannot resist substantial tensile loads.

SUMMARY

It is among the objects of the present invention to provide a well screen which is made of filament reinforced plastic which can be used interchangeably with the same pipes and fittings as metal well screens. It is another object to provide such a screen which is highly resistant to failure in response to tensile and torsion loadings. It is yet another object to provide such a screen which can be manufactured relatively quickly and economically. A still further object is to provide a method of manufacture which will enable an entire screen to be wound from a single bundle of resin-coated filaments. These and other objects are achieved by the well screen and method of the present invention. The screen basically consists of a central slotted portion having inwardly diverging slot-defining walls, an unslotted female end portion with an integrally formed internal thread and an unslotted male end portion which is formed with a plain outer surface into which an external thread is cut after the screen is cured. The screen is produced by moving a single bundle of resin-coated glass filaments containing perhaps 20 strands circumferentially and longitudinally relative to a special mandrel. The special mandrel has a slightly tapered tubular core member to which a plurality of helically ribbed, longitudinally extending segments are fastened by screws which have their heads inside the core member. The adjacent longitudinal edges of each pair of segments are devoid of ribs so as to define a series of spaced longitudinal grooves which have a depth equal to the depth of the helical ribs. A pair of end cap members have complementary portions which cooperate with the ends of the core member to prevent relative radial or rotational movement. One end cap has external threads at its end which is closest to the core member and a series of circumferentially spaced pins positioned axially beyond the threads and aligned with the longitudinal grooves between the segment ribs. The other end cap has a smooth cylindrical surface on its end which is closest to the core member, and a larger diameter end plate portion having a series of notches which are adapted to be aligned with the longitudinal grooves between the segment ribs. Since the mandrel assembly is adapted to be mounted in a lathe for rotation between the head stock and tail stock, there is no need to positively anchor the end caps to the core member.

The operation of winding the bundle of resin-coated filaments to form the well screen is initiated by anchoring the free end of the bundle to one of the pins on the threaded end cap. The mandrel is then rotated while the bundle is guided into the helical threads on the end cap. This causes the threads to be filled from their outer end to their inner end and continued rotation provides them with a helical overwrap layer while the bundle is returned to its starting point. During the first circumferential pass, the bundle will conform to the V-shape of the threads on the end cap, but during the return pass it will be flat so as to produce a continuous uniform thickness of material over the threaded region. The mandrel rotation is then stopped and the bundle is pivoted around a pin on the threaded end cap and traversed longitudinally in one of the longitudinal grooves between the segments. After being passed around one of the projections at the end of the non-threaded end cap, the mandrel is rotated while the bundle is helically wrapped in "out-to-in" and "in-to-out" circumferential passes. Rotation is again stopped and the bundle is then pivoted around a projection and moved longitudinally back and forth between the pins on the threaded end cap and the projections on the non-threaded end cap until all of the remaining longitudinal grooves are filled. Assuming that there are an even number of longitudinal grooves, the bundle will be at the threaded end cap when the last longitudinal groove has been filled. The mandrel is again rotated and the bundle is helically moved so as to produce a third pass of the threaded end cap. Continued rotation of the mandrel will cause the bundle to first fill all the slot-forming helical grooves between the ribs in the segments and then provide a third layer on the non-threaded end cap. At this point, the bundle can be tied to one of the end cap projections and cut from its source of supply. The entire mandrel and screen assembly is then heated in a conventional manner for a sufficient time to cure the resin. After curing, the portions of the threads which were wrapped around the pins and projections can be cut so as to permit the end caps to be removed. The threaded end cap is removed by unthreading it from the screen, while the other end cap can be removed axially. The slightly tapered core member can then be removed by first removing the screws holding it to the segments and then sliding it axially of the segments. The segments can then be moved radially inwardly of the screen. The male fitting threads are preferably cut into the screen after it is cured and, if desired, can be coated with resin or another sealant to protect them. A sealing coating decreases the likelihood that water could be absorbed by the filaments exposed by the cutting operation.

BRIEF DESCRIPTION OF THE INVENTION

FIG. 1 is an exploded isometric view of the various parts of the mandrel assembly;

FIG. 2 is a side view of the mandrel assembly;

FIG. 3 schematically illustrates a device for resin-coating the filament bundle before it is wrapped on the mandrel;

FIG. 4 illustrates a preferred arrangement of circumferential and longitudinal passes used to produce a well screen from one continuous bundle of filaments;

FIG. 5 is a side view of a filament-wound well screen produced in accordance with the invention;

FIG. 6 is a longitudinal axial section of the screen shown in FIG. 5;

FIG. 7 is a transverse section of an unslotted end portion of the screen taken on line 7—7 of FIG. 6; and FIG. 8 is a transverse section of a slotted portion of the screen taken on line 8—8 of FIG. 5.

DETAILED DESCRIPTION OF THE PREFERRED EMBODIMENT

Referring to FIG. 1, the mandrel assembly is indicated generally at 10 with its various parts in exploded relationship to each other. The core member 12 is slightly tapered from its larger diameter end 12' to its smaller diameter end 12" to facilitate its removal. A plurality of elongated, helically ribbed segments 14 have a short, unribbed left end portion 14' and a similar unribbed right end portion 14". A right end threaded end cap member 16 has an unthreaded outer end portion 16' which may be engaged by the chuck of a lathe for rotating the mandrel assembly. A left end non-threaded end cap member 18 has a cylindrical inner end portion 18' which is adapted to telescopically overlie a slightly recessed end portion 12''' at the left end of the core member 12. An internal plate or bulkhead member 20 is welded inside the core member 12. The plate 20 is used to assist in the disassembly of the end cap 18 and core member 12 after a well screen has been cured on the mandrel, as will be hereinafter explained. A plurality of circumferentially spaced holes 22 at either end of the core member 12 have screws 24 passed freely through them from the inside of the core member. The screws 24 engage threaded openings 26 in the ends of the segments 14 to retain the latter in tight positive engagement with the core member. Helical tapered ribs 27 on the segments 14 are provided for forming the openings in a well screen while the spaces 28 between them form the screen ribs. Longitudinal grooves 29 on the unribbed edges of the segments are provided for forming the longitudinal support bars of a screen. A reduced diameter portion 30 on the threaded end cap member 16 telescopically overlies the end portion 12' of the core member 12 and has an outer diameter which is flush with the unribbed surface of segments 14. A helical pipe thread 32 is formed on the cap member 16 for producing an internal thread on a well screen. Alignment bars 33 are provided in each end cap to snugly fit between an adjacent pair of screws 24 and prevent relative rotation. A plurality of circumferentially spaced pins 34 are located in the outer unthreaded end portion 16' of the end cap 16.

The left end unthreaded end cap member 18 has an end plate portion 38 integrally formed therewith or affixed to it which is of a larger diameter than the cylindrical portion 18'. The outer periphery of the end plate portion 38 has a plurality of projections 40 alternating with spaces 42. A screw 44 is shown as being threaded into an opening 46 in the center of end plate 38. The screw 44 is normally removed from threaded opening 46 when the mandrel assembly is mounted in a lathe since the tail center of the lathe goes in the hole 46. After a screen has been wound and cured and the end cap 18 is to be removed from the core member 12, the screw 44 is inserted into the threaded opening 46 and screwed inwardly against the plate 20 to force the end cap 18 to move away from the plate and away from the screen.

In FIG. 2, the mandrel assembly 10 is shown assembled prior to a winding operation. The winding operation is schematically illustrated in FIGS. 3 and 4. Circumferential winding is accomplished by rotation of a lathe (not shown), for example, in which the mandrel assembly is mounted. Axial movement during rotation would be provided by guide means (not shown) attached to the leadscrew of the lathe. A plurality of glass strands or ends 56', such as about twenty, for example, are wetted in a bath of resin 58 in a conventional manner. After the excess resin is removed by a squeegee 60, the strands are formed into a bundle 56 which is wrapped circumferentially and longitudinally of the mandrel assembly 10. The wrapping process illustrated in FIG. 4 has been found to produce a well screen of excellent strength characteristics, although it is obvious that other sequences of wrapping could be used.

Our preferred wrapping process illustrated in FIG. 4 is easily understood by relating it to the mandrel structure 10 shown in FIG. 2 and to the well screen 66 shown in FIGS. 5 and 6 which is produced on the mandrel. The screen includes a slotted central portion 68 and unslotted end portions 68' and 68". The male threads 70 are not formed on the mandrel, but are cut after the screen is cured. The female threads 72, the helical ribs 74, the helical slots 76 and the longitudinal bars 78 are all formed during the wrapping process. To initiate the wrapping process, the end of the bundle 56 is first tied or otherwise anchored to one of the pins 34 and the mandrel is rotated so that circumferential pass $C_1$ causes the threads in threaded section 32 to be filled from the right end of the section 32 to the left end to produce the female threads 72. The bundle 56 is then guided for movement back to the right and looped around one of the pins 34 in circumferential pass $C_2$ as the mandrel continues to rotate. The pass $C_2$ serves to build up the thickness of the right end 68' of the screen and provides a support base for the threads 72. Rotation of the mandrel is then stopped and the bundle 56 is moved the entire length of the mandrel in pass $L_1$ to produce the first longitudinal support bar 78. After the bundle is looped around one of the projections 40 on the left hand end plate, mandrel rotation is again commenced while the bundle is moved first to the right in pass $C_3$ and then to the left in pass $C_4$ to form two-thirds of the thickness of the left end portion 68". The mandrel rotation is then stopped and longitudinal passes $L_2$–$L_{10}$ are then made by wrapping the bundle around successive pins 34 and projections 40. This will bring the bundle 56 back to the right end of the mandrel. Mandrel rotation is then again commenced for the final pass $C_5$ which first provides a second support layer over the internal threads 72 and then forms all of the tapered helical ribs 74 which define the screen slots 76. Finally, the left end and final portion of pass $C_5$ forms the third and final layer of the end 68‴. As seen in FIG. 6, only the first longitudinal bar 78 formed by pass $L_1$ is exposed on the inside of the left end portion 68″ of the screen. The remaining bars, formed by passes $L_2$–$L_{10}$, are located between circumferential layers. For example, at each end of the screen the majority of the bars are positioned between the second and third circumferential layers. This arrangement causes better bonding between the circumferential and longitudinal wraps and greatly enhances the resistance of the screen to tension loads as compared to a screen wherein all or most of the longitudinal bars lie under the first circumferential layers where they have only onesided contact with the circumferential layers.

FIG. 7 is an enlarged, fragmentary cross-section through the unslotted end portion 68″ of the screen and illustrates the enhanced bond of the longitudinal bars 78 formed in passes $L_2$ and $L_{10}$ as compared to $L_1$. Where utmost strength is required, pass $L_1$ could also be embedded between layers, but the bundle 56 would have to be cut after pass $C_2$ and then tied to projection 40 so that passes $C_3$ and $C_4$ could be initiated. Pass $L_1$ would then not be made until after passes $C_3$, $C_4$ and $L_2$–$L_{10}$ were completed.

FIG. 8 is a cross-section showing the shape of the ribs 74 and slots 76 produced by the slots 28 and ribs 27, respectively, of the mandrel segments 14.

When winding of the bundle 56 on the mandrel 10 has been completed, the bundle is tied off around a projection 40 and the mandrel is heated to cure the resin and rigidify the screen. After curing, the various portions of the bundle 56 which were looped around pins 34 and projections 40 are severed. The end cap 16 is then unscrewed from the thread 72 formed by it while bolt 44 is inserted in threaded opening 46 and tightened against the plate 20 until the end cap 18 is forced out of contact with the core 12. The tapered core member 12 is then removed from the segments 14 by first removing all the screws 24 from holes 26,22 and then tapping plate 20 with a hammer to permit it to be removed axially from the segments 14 so that the segments can be collapsed internally out of contact with the screen ribs 74 which they formed. To facilitate inward collapse, the longitudinal edges of the segments are relieved inwardly and also positioned with a slight space between them. The space is preferably covered with tape to seal out resin during winding. A mold release agent is preferably sprayed on the mandrel to aid in its removal from the screen 66.

We claim as our invention:

1. A well screen formed entirely of filament reinforced plastic and having an elongated helically slotted screen portion and integral non-slotted end portions, said filaments or strands, each of which is resin-coated, being arranged in both longitudinal and circumferential directions throughout the entire length of said well screen, one of said non-slotted end portions having female threads formed therein by at least one layer of helically wound circumferential filaments which is/are positioned radially inwardly of a subsequently applied layer of longitudinal filaments, which subsequently applied layer forms the radially innermost layer in a region between said non-slotted end portions.

2. A well screen according to claim 1 wherein said end portion having female threads formed therein has all of its longitudinal filaments positioned intermediate said at least one inwardly positioned layer of helically wound filaments and an outwardly positioned layer of circumferential filaments, said other of said non-slotted end portions and said elongated slotted screen portion each having all of its longitudinal filaments covered by at least one outer layer of circumferential filaments.

3. A well screen according to claim 2 wherein said end portion having female threads formed therein has two internal layers of circumferential filaments covered first by a layer of longitudinal filaments and then by an additional layer of circumferential filaments, said other of said non-slotted end portions having three layers of circumferential filaments.

4. A well screen according to claim 3 wherein said other of said non-slotted end portions has at least some of its strands of longitudinal filaments positioned so as to overlie two of said three layers of circumferential filaments.

5. A well screen according to claim 4 wherein said other of said non-slotted end portions has the majority of its strands of longitudinal filaments positioned so as to overlie two of said three layers of circumferential filaments.

6. A well screen according to claim 4 wherein said other of said non-slotted end portions has all but one of its strands of longitudinal filaments positioned so as to overlie two of said three layers of circumferential filaments.

7. A well screen according to claim 1 wherein the other of said non-slotted end portions has at least one strand of longitudinal filaments positioned radially inwardly of any of its circumferential filaments.

8. A well screen according to claim 7 wherein all of the circumferential and longitudinal filaments forming the screen are portions of a single bundle of filaments from which the entire screen is wound under tension in one continuous operation.

9. A method of forming a slotted well screen having a plurality of longitudinal support bars and integral non-slotted end fittings comprising providing a collapsible mandrel having spaced, helical, tapered interrupted rib portions and spaced longitudinal groove portions along its length which are defined by the rib interruptions, attaching an extension to each end of the mandrel with one extension having a smooth outer surface and the other having a helically threaded outer surface which is a negative of a female thread to be formed internally of one end of the well screen, passing a bundle of glass filaments through a resin bath to coat the filaments and then anchoring one end of the bundle to a pin at the end of said other extension and proceeding to rotate said mandrel and extensions while guiding said bundle axially of said mandrel in one direction to cause said bundle to first fill said helically threaded portions of said other extension and then in the opposite direction to form a layer over it, stopping the rotation of said mandrel, rotating the mandrel while laying down a layer in one axial direction and then the opposite direction to cover the extension having the smooth outer surface, stopping the rotation of the mandrel and alternately passing the bundle longitudinally from one end to the other to form a plurality of circumferentially spaced longitudinal support bars, rotating the mandrel while guiding the bundle for the length of the mandrel to additionally cover each extension portion and said plurality of longitudinal support bars and produce the helical ribs which define the screen slots, curing the well screen and removing the mandrel.

10. The method as defined in claim 9 wherein said bundle is passed the entire length of the mandrel to form an additional longitudinal support bar during the period that the mandrel rotation is stopped after forming the initial layers over said other extension and before rotation is recommenced to form the two layers which cover the extension having the smooth outer surface.

11. The method as defined in claim 9 wherein the mandrel includes a series of circumferentially spaced pins or projections at each end, the longitudinal support bars being formed by passing the bundle axially between and around such pins or projections and the step of removing the mandrel including the step of severing all of the glass filaments in the vicinity of the pins or projections.

12. The method as defined in claim 11 wherein said step of removing the mandrel further includes the steps of unscrewing the threaded mandrel extension from one end of the well screen, axially withdrawing the other mandrel extension and collapsing the portion of the mandrel between the extensions.

13. The method as defined in claim 9 wherein the entire well screen is wound from a single bundle of resin-coated glass filaments which is not cut until after the screen is wound.

* * * * *